Figure 1:
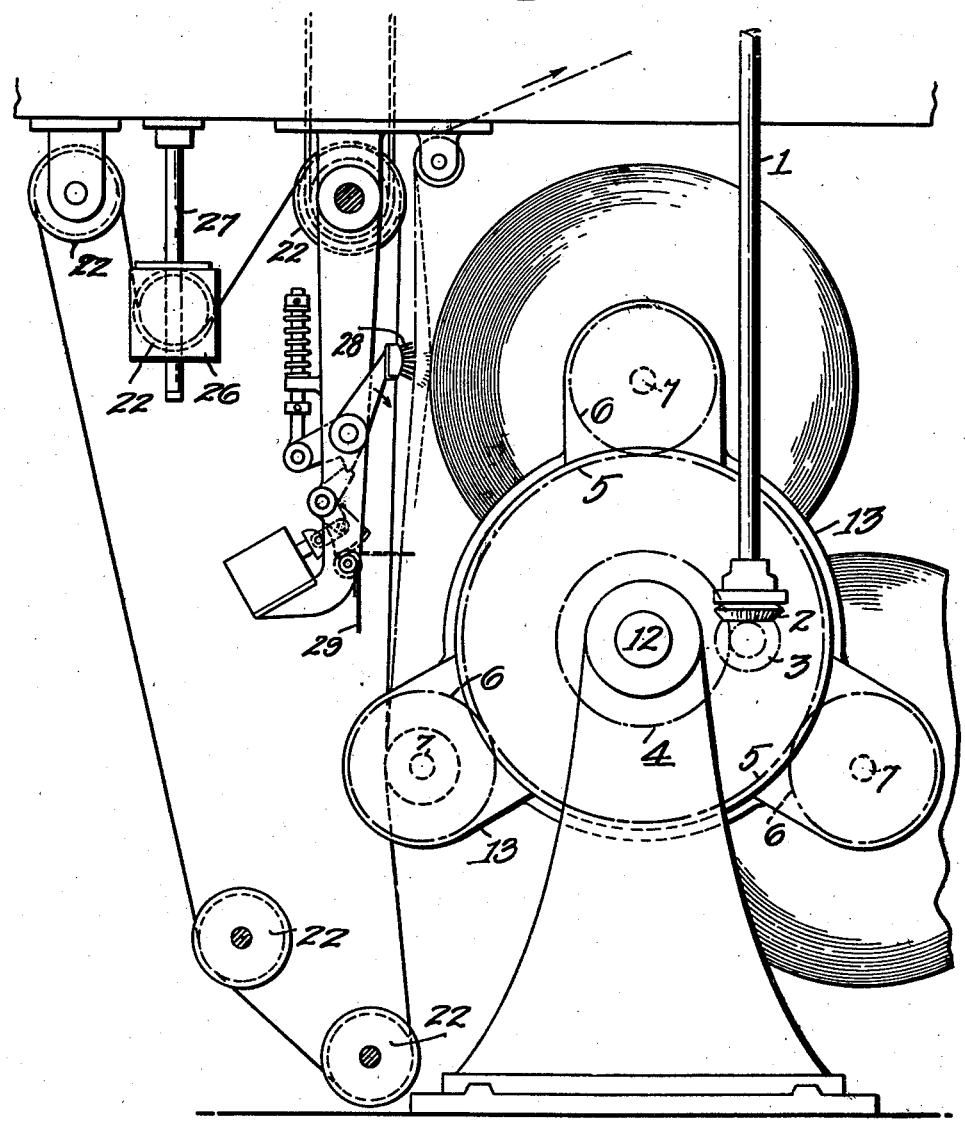

Feb. 9, 1937.  H. A. W. WOOD  2,070,327
PAPER ROLL BRAKING MECHANISM
Original Filed June 8, 1931   2 Sheets-Sheet 1

Inventor
Henry A. Wise Wood
by attorneys

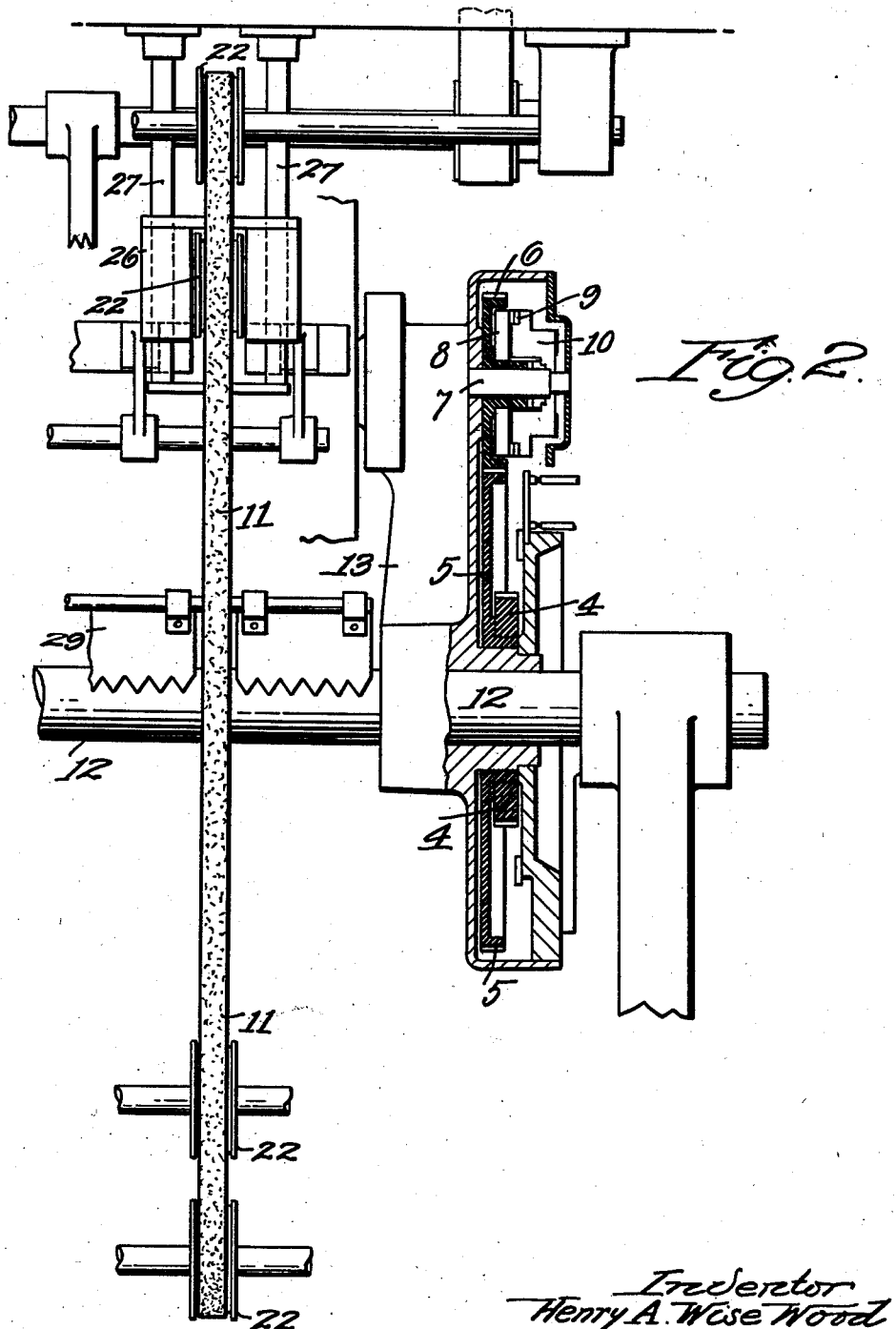

UNITED STATES PATENT OFFICE 2,070,327

PAPER ROLL BRAKING MECHANISM

Henry A. Wise Wood, New York, N. Y., assignor to Wood Newspaper Machinery Corporation, New York, N. Y., a corporation of Virginia Application June 8, 1931, Serial No. 542,865
Renewed July 6, 1936

3 Claims. (Cl. 242—75)

This invention relates to the same subject matter in general as my prior application Serial No. 513,119. In that case is disclosed the fundamental idea of braking a paper roll during an emergency stop on a printing press by the combined action of the application of force to the surface of the roll by the normal tension members and the application of a braking effect at the center of the roll through the spindle.

The principal object of this invention is to provide a combination of braking forces between the application of power or force to the spindle of the roll and the application of normal tension on the surface of the roll exerted by running belts. This invention can be used as shown herein with an automatic splicing device for renewing paper rolls as they are exhausted. However, it can be used for other machines which operate a heavy roll of paper or other material.

Other objects and advantages of the invention will appear hereinafter.

Reference is to be had to the accompanying drawings, in which—

Fig. 1 is an end view of a reel for a web splicing device showing a preferred embodiment of this invention, and Fig. 2 is an elevation of the same with the brake mechanism shown in central section.

As in the above mentioned application, the device is driven from the printing press by a shaft 1 which is geared thereto. This shaft, through bevel gears 2 and 3, drives a pinion meshing with a gear 4. The gear 4 is bolted to a large gear 5 rotatably mounted on a housing carried on the shaft 12 of the reel 13. This gear 5 meshes with three gears 6, one on each of the three spindle shafts 7 shown as carried on this reel. Each gear 6 runs free on the spindle shaft 7 and carries a disc 8 bolted to it. This disc is so arranged as to contact with a brake lining 9 carried by a magnetic clutch 10 when this clutch is energized. The clutch 10 is secured to the shaft 7 and that shaft is keyed to the core of the paper roll.

When the magnetic clutch 10 is energized the paper roll is driven or retarded in fixed relation to the speed of the press. If the press is accelerated or decelerated rapidly the paper roll will tend to follow these changes of speed. Since the magnetic clutch has frictional clutch surfaces there will be a slight slip if the changes are too sudden. In normal operation the magnetic clutch is deenergized and tension is applied by running the belts 11 which are driven in fixed relationship to the press in the manner shown otherwise. However, when an emergency stop is made it is well known that such running belts do not exert enough force to prevent a running roll running more rapidly than the press.

In this case, by any ordinary means, the clutch 10 is energized the instant an emergency stop is made so that we shall have immediately the combination of braking through the spindle with that of the normal tension exerted by the belts 11. Thus the roll is brought down to a stop with the press so that no slack in the web occurs and the braking is not severe enough to break the web by too much tension. Thus an arrangement is provided for braking the paper roll on sudden deceleration of the press by the application of a braking force through the spindle in combination with the tension exerted by running belts against the surface of the roll.

A set of running belts 11 is shown being carried over guide pulleys 22. One of these pulleys is driven from the press so that a fixed relation of speed is maintained between the press and belts 11. A preferred manner of driving these belts is that which causes the belts to run slightly slower than the web so that a tension is maintained on the paper. One idler pulley is mounted between two halves of a weight 26 which in turn is slidably mounted on rods 27 to allow up and down motion. This arrangement keeps an even tension on the belts whether or not the belts are operating against a small or a large size roll.

An arrangement is shown for carrying the brush 28 for splicing the web and the knife 29 for severing the old web after splicing.

It is also within the scope of this invention to have the magnetic clutch 10 fixed to the reel and operating in the manner described above.

It will be seen from the above that a combination of forces is applied for controlling the proper deceleration of the web roll. The application of friction to the surface of the roll by belts is employed and is amplified by the retardation through the central axis of the roll as described. Thus I have a combination of retarding forces when the press is rapidly decelerated and running a large roll.

Although I have illustrated and described only one form of the invention I am aware of the fact that modifications can be made therein by any person skilled in the art without departing from the scope of the invention as expressed in the claims. Therefore, I do not wish to be limited in this respect, but what I do claim is:—

1. In a web supplying device for a printing press, the combination with tension belts running at less than running speed and acting on the surface of a running roll to retard its speed of rotation, of a rotary retarding device located at the end of the running roll and acting on the roll shaft to retard the roll only when the roll is being slowed down, while the first named retarding means is in action and means for operating said retarding device in proportion to the speed of the press.

2. The combination with means for supporting a web roll, a set of tension belts adapted to engage the running roll, means connected with the press for running said belts at a speed a little less than web speed to tend to retard the web at all times, means acting at the center of the running roll for retarding it frictionally from the press when the press is being slowed down, whereby the two forces are both non-positive and cooperative to keep the web from running too fast on a sudden stop and to keep it from breaking, and means operated by the press for running said retarding means forward.

3. The combination with means for supporting a web roll in position to supply the web to a printing press, of means tending to rotate said roll by action through its central axis, when the web is being slowed down, at a speed slower than web speed; and means for operating the last named means in proportion to the speed of the press.

HENRY A. WISE WOOD.